United States Patent

Kramer et al.

[11] 4,029,292
[45] June 14, 1977

[54] GLOBE VALVE CONSTRUCTION

[75] Inventors: Rolf Kramer, Siegen; Felix Schneider, Netphen, both of Germany

[73] Assignee: Eisenbahn-Verkehrsmittel AG, Germany

[22] Filed: Apr. 6, 1976

[21] Appl. No.: 674,082

[52] U.S. Cl. .............................. 251/163; 251/188
[51] Int. Cl.² ........................................ F16K 25/00
[58] Field of Search .................... 251/162, 163, 188

[56] References Cited

UNITED STATES PATENTS

| | | | |
|---|---|---|---|
| 1,927,855 | 9/1933 | Swanson | 251/163 |
| 3,245,653 | 4/1966 | Lavigueur | 251/163 X |
| 3,626,498 | 12/1971 | Rihm | 251/163 X |

*Primary Examiner*—Harold W. Weakley
*Attorney, Agent, or Firm*—McGlew and Tuttle

[57] ABSTRACT

The valve construction comprises a valve housing which has a housing flow passage therethrough and an intermediate spherical valve chamber in the passage. A pivot member which has concentric end journal portions is rotatably mounted in the housing and has an intermediate eccentric portion which is offset from the end journal portions and is located in the valve chamber. A spherically shaped globe valve member having a valve flow passage therethrough opening at respectively diametrically opposite ends of the valve member is rotatably supported on the eccentric portion which extends through diametrically opposite walls of the globe valve member which has an axis at right angles to the axis of the valve flow path. A dog carried on the globe valve member projects outwardly therefrom into a groove of the housing and limits the movement of the globe valve member relative to the pivot to 90°. The valve is opened by pivoting the pivot member to cause a pin which is carried on the globe member to ride in a 90° arcuate groove defined in the pivot member and without rotating the globe member. Thereat, the pin bears against the end of the arcuate groove of the pivot member so that the valve member and the pivot member rotate together, positioned in the passages in the valve globe in alignment with the passages in the valve housing. This also causes a ball member which is arranged in a recess of the pivot and biased outwardly by a spring to ride into a notch of the valve globe member. Return of the pivot in an opposite direction causes the ball which is engaged in a notch to cause movement of the valve globe member to a closed position at which its flow passage therethrough is not aligned with the flow passage of the housing once again. In the closed position the spherical surfaces of the valve globe member are also urged against an angular sealing member which is carried on a ring which is biased in a direction toward the valve globe member at one end of the housing flow passage. This displacement of the valve globe member is accomplished by the eccentricity of the pivot on which it is supported.

6 Claims, 4 Drawing Figures

GLOBE VALVE CONSTRUCTION

FIELD AND BACKGROUND OF THE INVENTION

This invention relates in general to the construction of valves and in particular to a new use for a valve globe member which includes a spherical globe valve which is carried on an eccentric portion of a pivot pin and which may be eccentrically displaced in an intermediate spherical portion of a flow passage of the valve housing. An interengagement is provided with a resilient packing or seal in a closed position which may be also rotated on the eccentric pivot to either align or misalign the flow passage through the valve globe member with the flow passage through the housing.

DESCRIPTION OF THE PRIOR ART

The present invention relates to the construction of a globe valve particularly for shutting off discharge lines of tank cars. Globe valves are known generally. They have the advantage that they can be manufactured in a relatively economical manner and they require very little maintenance and can be connected to the discharge line by any end of their passage. The disadvantage of the known globe valves is the great tendency for them to wear out the packings between the valve globe and the valve housing. This is because of the friction between the globe and the aperture edges of the passage therethrough on the packing of the valve housing. Such packing is usually very strongly stressed by the globe valve and partly squeezed off.

It is known to dispose the packing of the valve housing in a bushing which is mounted in an axial alignment with the valve passage, and which is mounted for longitudinal displacement within the valve housing. The bushing is spring-loaded in the direction of the valve globe, so that upon a partial wear of the packing the tightness is still ensured. However, even with this design the wear on the packing is not prevented.

SUMMARY OF THE INVENTION

The present invention is directed to a globe valve which is constructed to ensure that a wear of the packing between the valve globe and the valve housing is prevented, and that dimensional differences between the mounted position of the valve globe and the valve housing due to structural inaccuracy will not lead to a leakage of the globe valve and that the contact pressure on the packing of the valve housing remains uniform.

In accordance with the invention a globe valve is provided which includes a pivot which is journaled at each end in a housing and includes a central eccentric portion upon which a spherical valve globe is mounted for rotation thereon. Dog and stop means are provided on the pivot and on the valve globe which permit a free turning of the pivot in the globe while turning the pivot to effect the opening of the valve during the first phase of the motion, and which ensures a joining of the globe and the pivot together during a second phase of the motion. During the closing of the valve the movement of the pivot also takes along the globe therewith during a first phase of the motion and permits the free turning of the pivot in the globe during a second phase of the motion, and the eccentric movement effects a shifting of the spherical outside surface of the globe valve member into engagement with an annular packing arranged at one end of the housing flow passage. Due to the inventive arrangement the valve globe is moved during a first phase of the opening movement so that it is lifted from its packing and without effecting a rotary motion. Only after the valve globe has been lifted away from the packing does the globe turn until the flow passage defined therethrough is axially aligned with the flow passage of the valve housing. During the closing motion the valve globe is first turned through 90° so that the outer surface of the globe does not come into contact with the packing of the valve housing and only after this turning motion is accomplished is the globe shifted against the packing by the eccentricity of the pivot. Thus a friction between the valve globe and the packing is advantageously prevented. The packing is mounted in a bushing which is slidably guided in its longitudinal direction in the valve housing. On its outer surface which is guided in the valve housing the bushing is shaped spherically. Due to this spherical shape, should structural inaccuracies occur between the valve globe and the valve housing, the bushing adjusts itself automatically, thereby ensuring a completely satisfactory sealing.

In accordance with one embodiment of the invention the dog means comprises a pin which is mounted on the globe member and engages in an arcuate groove defined on the eccentric portion of the pivot pin which extends through approximately 90°. The other dog means comprises a spring-loaded ball which is mounted for radial motion in a recess of the pivot and is urged outwardly by a spring into engagement with a notch which is defined at one location on the globe. Advantageously, particularly for permitting a large lifting clearance between the globe and the packing, in the closing position of the globe, the eccentric portion of the pivot occupies a position which is offset in the direction of the bushing; while in the open position of the globe the eccentric portion of the pivot is in a position which is offset in the opposite direction.

In order to prevent the bushing from following the globe too far under the action of the spring means during the lifting of the globe from the packing, the bushing, which is longitudinally displaceable in a known manner against the action of the spring means and carries the packing both at its side facing the globe and on its outer surface which is guided in the valve housing, it is mounted in the valve housing so that its longitudinal displacement is limited by stops.

The valve globe is actuable by means of a handle which is secured to the pivot. The handle is movable between defined limits of 180° between stops defined on the valve housing which are engageable by dog portions defined on the handle. Due to this design an overloading of the dog and stop means of the valve globe and the pivot is advantageously prevented.

According to another embodiment of the invention, the valve globe is designed as a hollow partial sphere, with only that portion of the globe having the shape of the sphere which, in the closing position, applies against the bushing and which is adjacent thereto. This design makes it possible to reduce the weight of the globe and thereby the manufacturing cost of the globe valve.

Accordingly it is an object of the invention to provide an improved valve construction which includes a spherical globe member arranged in a spherical intermediate portion of a through-flow passage of a housing and which has a flow passage through it which aligns with the flow passage of the housing in an open position and which may be moved out of alignment with the flow passage in the housing by rotating it around an eccentric portion of a pivot which extends through the globe member in a direction at right angles to the flow passage, and which is connected to the globe member through a dog and stop arrangement so that during a portion of its movement, for example in which the globe valve member is lifted off an annular packing at one end of the flow passage in the housing, it is not rotated relative to the pivot but instead it is rotated subsequently to position the passage therethrough which has been moved out of alignment with the flow passage of the housing into alignment therewith.

A further object of the invention is to provide a valve construction which is simple in design, rugged in construction and economical to manufacture.

DESCRIPTION OF THE PREFERRED EMBODIMENT

Figure 1:
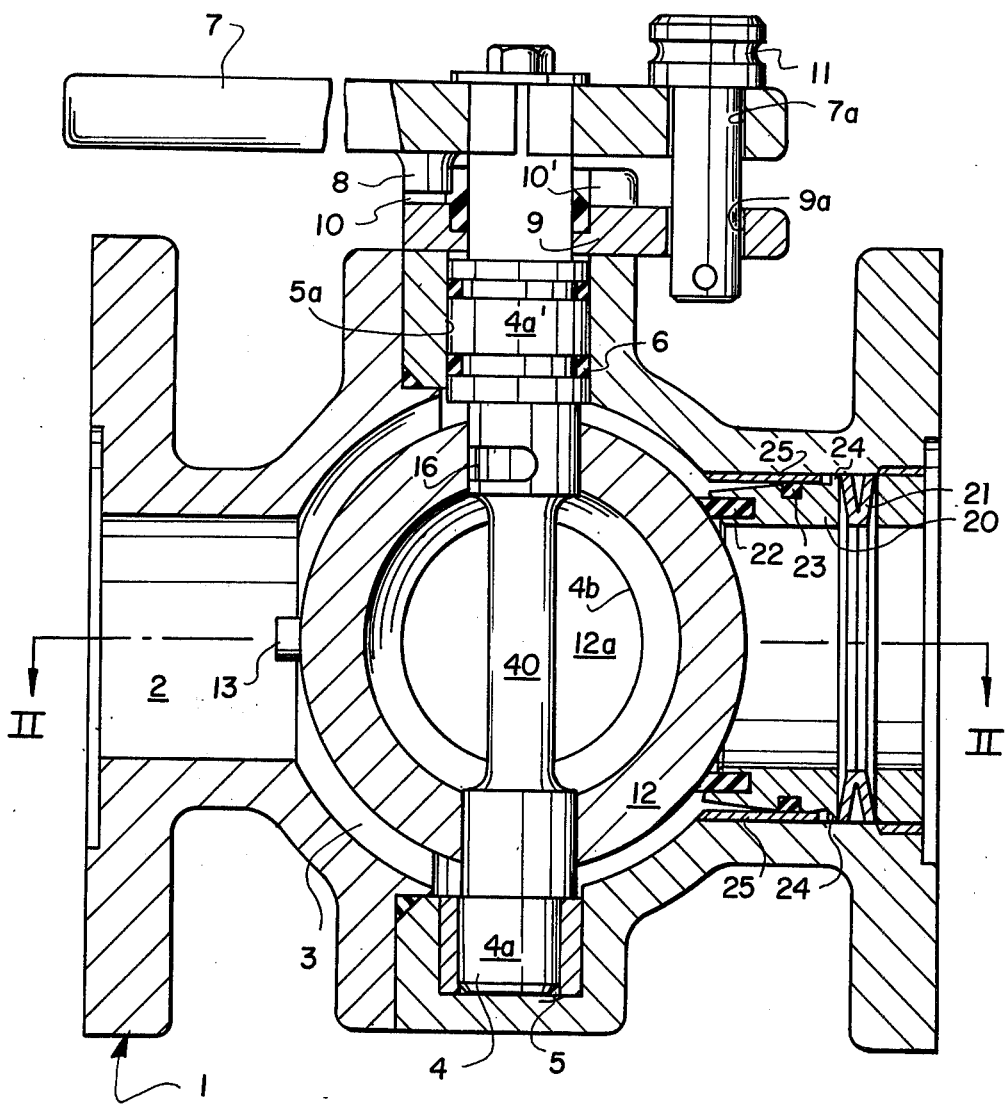
FIG. 1 is a vertical longitudinal sectional view of a globe valve constructed in accordance with the invention.

Referring to the drawings in particular the invention embodied therein comprises a globe valve which includes a globe valve housing generally designated 1, having a transverse flow passage 2 therethrough for the flow of fluid. In the preferred design the valve housing is separated in the center in order to facilitate the assembly. In the finished mounted state the two half-portions are secured together. The flow passage 2 includes an intermediate portion forming a spherical valve chamber 3.

In accordance with the invention a pivot member or pivot 4 is disposed transversely to the flow passage 2 and it includes concentric portion 4a and 4a', which are concentrically mounted in respect to the valve chamber 3, in a blind journal hole 5 and an open end bearing 5a respectively. At the open end it is supporting on a bearing with packing 6 which seals the pivot against the valve housing 1. A handle 7 is secured to the outer end of the pivot 4 and it has a stop dog portion 8 thereon, which is engageable with one of two end stops 10 and 10' defined on a limit member 1. The lifting member 9 is centered on the pivot 4 and firmly secured to the housing 1. The handle 7 and the limiting member 9 are further provided with a bore 9a and 7a, respectively, which are aligned with each other in a closed position. A safety bolt 11 may be passed through the bore 7a and 9a in order to lock the handle 7 in position.

Figure 2:
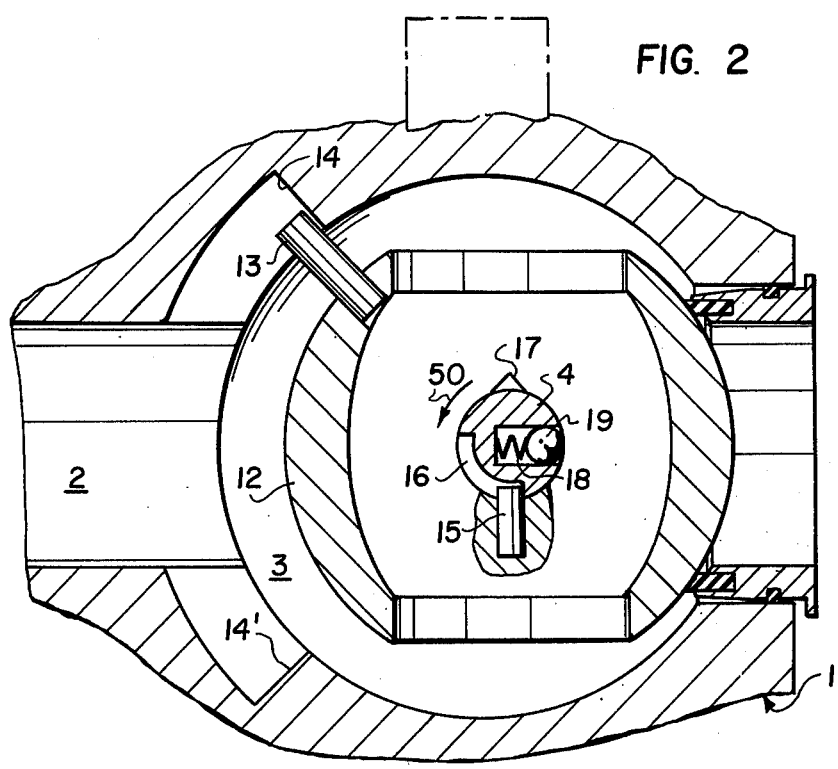
FIG. 2 is a section taken along the line II-2 of FIG. 1.
Figure 4:
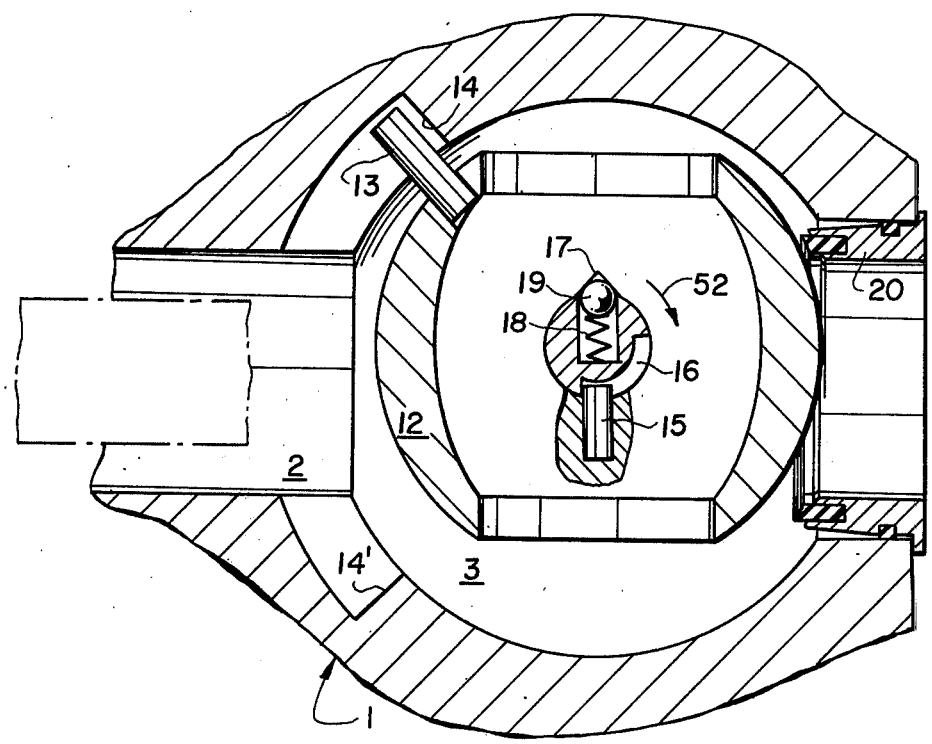
FIG. 4 is a view similar to FIG. 2 showing the valve in a half-open position.

The pivot 4 includes a central eccentric portion 40 arranged in the chamber 3, and which is offset from the concentric end portions 4a and 4a'. A valve globe member 12 is mounted for rotation on the eccentric 40. The valve globe member includes a through flow passage 12a which may be aligned with the flow passage 2 of the valve housing, or it may be positioned in the non-aligned closed position as shown in FIGS. 1, 2 and 4. A valve globe 12 carries a dog 13 which rides in a groove of the housing having stops 14 and 14' at respective ends, which limits the turning movement of the valve globe member 12 to approximately 90°. In addition a pin 15 carried by the globe member 12 engages in an arcuate groove 16 formed on the eccentric portion 40 on the end thereof adjacent to handle 7. The globe member is also provided with a notch 17 which is diametrically opposite to pin 15. This notch cooperates with a ball member 19 contained in a recess of the eccentric 40 and which is biased outwardly by a spring 18 so as to engage into the notch 17 whenever the ball is aligned therewith.

Figure 3:
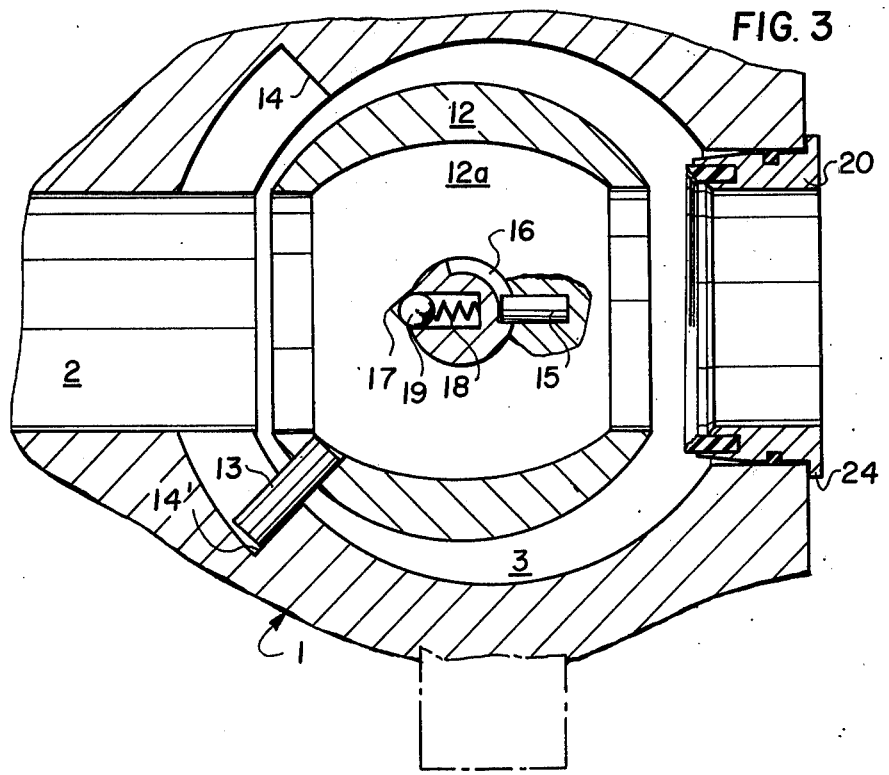
FIG. 3 is a view similar to FIG. 2 showing the valve in an open position.

In accordance with a further feature of the invention a bushing 20 is mounted in the flow passage 2 adjacent at one end and it is movable between defined limits. The bushing is biased by springs 21 in the direction of the valve globe member 12, and it contains a packing 22 on the valve side which is adapted to bear tightly against the valve globe periphery in a closed position. The peripheral surface of the bushing 20 also carries a packing 23 which seals the bushing 20 with the housing 1. The displacement of the bushing is limited in an axial direction by stops 24 of the bushing which, as shown in FIG. 3, abut against the end of the housing in the innermost position. Bushing 20 is mounted by an intermediate bushing 25, which is shown only in FIG. 1 and has been omitted from the showings of FIGS. 2, 3 and 4 for clarity of illustration purposes. The bushing 25 is made of a non-corrosive material.

The operation of the valve is as follows: To open the valve the safety bolt 11 is removed and the handle 7 is picoted to approximately 180°. The angular motion of the handle 7 is limited by the stop dog 8 when it stops on a stop 10' at the opposite end of its movement. The pivoting of the handle causes the pivot 4 to be rotated and, in the first phase of its rotation, the pin 15, as shown in FIGS. 2-4 and which is carried by the globe valve 12, rides in the arcuate groove 16 so that the pivot 4 turns freely without the turning of the globe valve 12 until the pin moves to the end of the slot 16. The movement of the handle 7 to an open position causes a rotation of the pivot 4 in the direction of the arrow 50 and the free rotary movement of the pivot 4 in the globe 12 continues through approximately 90°. During this rotary motion the globe 12 which is mounted on the eccentric portion 40 of the pivot is lifted from the packing 22 of the bushing 20 and moved along an arcuate path. Upon rotation through approximately 90° of the pivot 4 the pin 15 then abuts upon the end face of the groove 16 and further movement effects the taking along of the globe valve member 12 for another 90° of movement until the dog 13 carried by the globe valve member 12 abuts against the stop portion 14' of the housing 1. At the same time the handle will abut against the stop 10'. In this end position of the globe valve 12, the globe valve flow path 12a aligns with the flow passage 2 of the housing. This comprises a fully open position in which flow to the valve may be effected.

In order to close the valve the handle 7 is pivoted back through the same angle of approximately 180°. In the first phase of its backward closing motion the globe valve member 12 is pivoted through approximately 90° due to the interengagement of the ball 19 in the notch 17 under the urging of the spring 18. This movement continues in the direction of the arrow 52 until the dog 13 abuts the stop 14. During the further turning of the pivot 4 it turns freely in the valve globe 12 and the pin 15 moves freely in the groove 16. During this last phase of the rotary motion of the pivot 4 due to the eccentricity of the eccentric portion 40 the globe 12 is shifted against the packing 22 of the bushing 20 by movement along an arcuit path. The bushing 20 due to its mounting for longitudinal displacement and swinging motion within the housing which is made possible by a spherical peripheral shape, adjusts itself to the valve globe 12 and thereby ensures an exact feeling with a uniform contact pressure.

The valve globe member 12 may also be designed as a partial spherical member in which only the portions necessary for mounting the area of the globe valve member which must apply against the bushing 20 in the closing position is maintained as a spherical surface. In this manner the weight of the overall member may be reduced and that portion of the valve member which is remote from the bushing may be even completely removed.

While specific embodiments of the invention have been shown and described in detail to illustrate the application of the principles of the invention, it will be understood that the invention may be embodied otherwise without departing from such principles.

What is claimed is:

1. A valve construction comprising a valve housing having a housing flow passage therethrough, said flow passage including an intermediate valve chamber therein, a pivot member having concentric and journal portions rotatably mounted in said housing and having an intermediate eccentric portion offset from said end journal portions located in said valve chamber, an annular sealing bushing located in said housing flow passage adjacent an end thereof and carrying an annular seal at the end thereof facing said valve chamber, a globe valve member having a spherical surface on a side facing said bushing and having a valve flow passage therethrough opening at respective diametrically opposite ends of said globe valve member, said globe valve member being rotatably supported on said eccentric portion of said pivot, said eccentric portion extending through diametrically opposite walls of said globe valve member and having an axis which is at right angles to the axis of said globe valve flow passage, means connected to said pivot to rotate said pivot through an angle of approximately 180° and to return it through the same angle, limit means defined between said housing and said globe valve member to permit pivotal movement between an open position in which said globe valve flow passage aligned with said housing flow passage and to a closed position in which said globe valve flow passage is moved out of alignment with said housing flow passage, and a lost motion connection between said pivot and said globe valve member effecting combined rotation of said globe valve member and said pivot during a portion of the rotation of said pivot and a separate relative rotation of said pivot and said globe valve member during a remaining portion of the movement, said globe valve member being shiftable due to the eccentricity of said eccentric portion during a portion of the rotation of said pivot, so as to be shifted into engagement with said annular seal on said bushing during that period in which said globe valve is not rotated relative to said pivot.

2. A valve construction according to claim 1 including a handle connected to said pivot for shifting said pivot, said housing having first and second dogs thereon engageable with said handle at each respective hand position of its movement, said housing also including a housing portion having a lock bore, said handle having a handle bore alignable with said lock bore when said handle is in a valve closing position, and a pin engageable through said handle bore and said lock bore to lock said valve in a closed position.

3. A valve construction according to claim 1 wherein said lost motion connection comprises a pin secured to one of said globe valve member and said pivot and an arcuate groove formed on the other of said globe valve member and said pivot into which said pin extends and further including a notch defined on one of said globe valve member and said pivot and a recess having a spring and a ball therein biasing said ball outwardly for engagement in said notch defined on the other of said globe valve member and said pivot, said notch being oriented in a fully closed position at 90° from one end of said arcuit groove, said ball being located at 90° from said notch and from the other end of said arcuate groove.

4. A valve construction according to claim 1 wherein said eccentric portion of said pivot is offset in the direction of said bushing in the closed position of said valve and, in the open position of said valve, the offset portion of said pivot is in a position which is offset in the opposite direction.

5. A valve construction according to claim 1 wherein said annular bushing includes a spherical outer surface said housing in a portion surrounding the flow passage adjacent said bushing comprising a cylindrical surface against which the spherical surface of said bushing bears to permit tilting movement thereof, spring means urging said bushing in a direction towards said globe valve member, and stop means defined between said housing and said bushing for limiting the axial movement thereof.

6. A valve construction according to claim 1 wherein said globe valve member comprises a hollow partial sphere with a through passage defined therethrough extending diametrically and which is oriented in a closed position with one side bearing against said bushing and with its flow passage having an axis at right angles to the flow passage of said housing.

* * * * *